Figure 1:
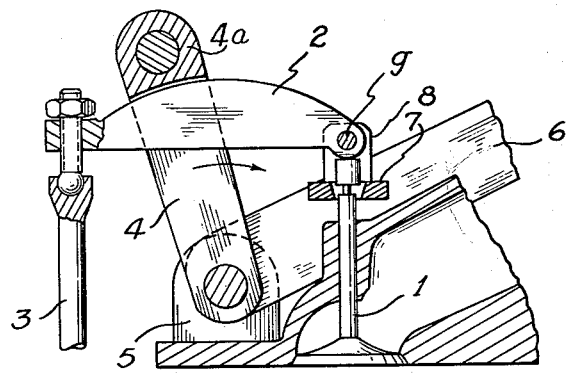

Jan. 19, 1965   J. KONRAD ETAL   3,166,057
METHOD AND APPARATUS OF UTILIZING EXHAUST
GASES IN THE INTERNAL COMBUSTION
ENGINE CYCLE

Filed March 26, 1963   5 Sheets-Sheet 1

INVENTORS
Erhard Mühlberg
Jakob Konrad

BY Bailey, Stephens & Huettig
ATTORNEYS

INVENTORS
Erhard Mühlberg
Jakob Konrad
BY Bailey, Stephens & Huettig
ATTORNEYS

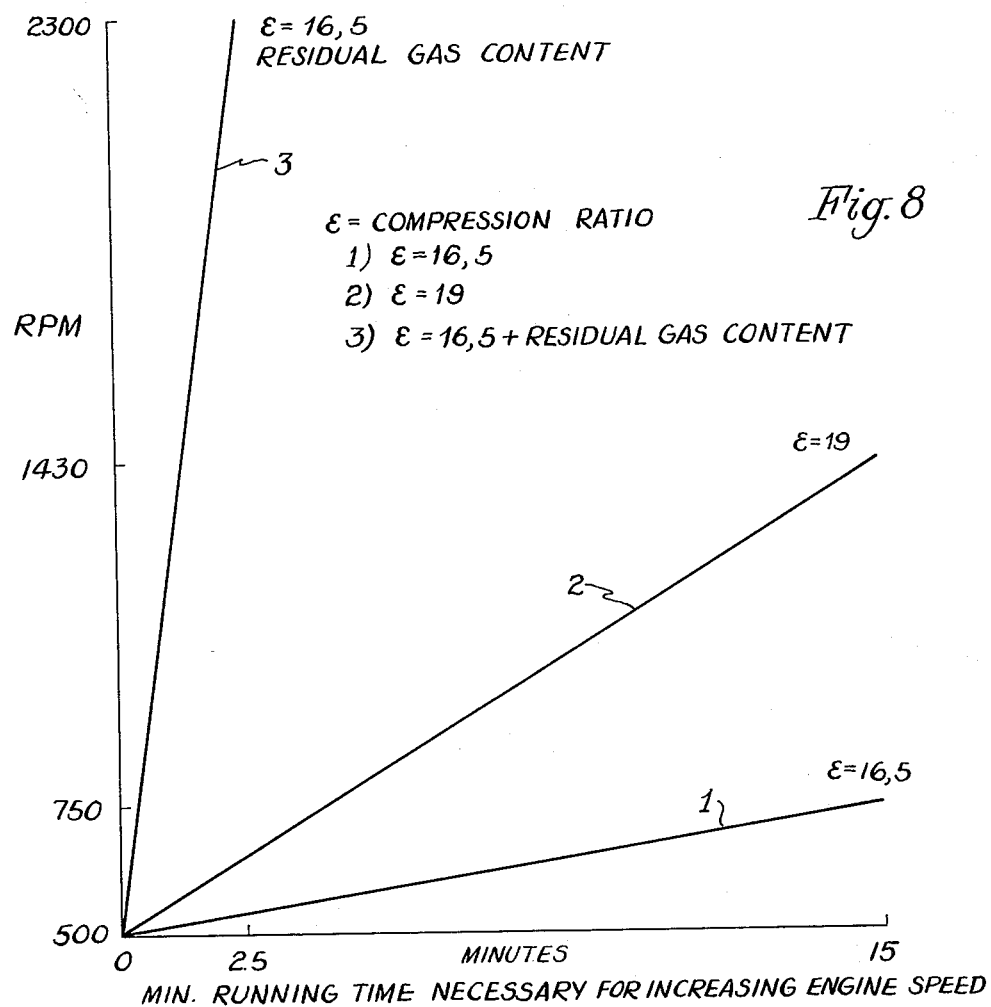

United States Patent Office 3,166,057
Patented Jan. 19, 1965

3,166,057
METHOD AND APPARATUS OF UTILIZING EXHAUST GASES IN THE INTERNAL COMBUSTION ENGINE CYCLE
Jakob Konrad, Nurnberg-Reichelsdorf, and Erhard Mühlberg, Nurnberg, Germany, assignors to Maschinenfabrik Augsburg-Nurnberg AG, Nurnberg, Germany
Filed Mar. 26, 1963, Ser. No. 268,188
Claims priority, application Germany, Oct. 17, 1959, M 43,089
2 Claims. (Cl. 123—90)

This application is a continuation-in-part of our application Serial No. 62,782 filed October 14, 1960, for method and apparatus for "Re-utilizing Engine Exhaust Gases" and now abandoned.

This invention relates to a method and apparatus for retaining a controlled amount of burnt gases in the cylinder of reciprocating and rotary internal combustion engines to improve ignition and combustion conditions for multi-fuel operation and to reduce the emission of obnoxious constituents in the exhaust gases and to reduce the fuel consumption and to lower the combustion noise level.

The development of internal combustion engine has relied primarily on two classes of fuels and two working cycles:

(1) Highly volatile fuels having a low ignition quality, the engines using this fuel working on the Otto cycle. The Otto-cycle engine relies on the carburetor for mixture formation and the spark plug for ignition.

(2) Low volatile fuels which have a good ignition quality, the engines using this employing the diesel cycle. The diesel engine relies on fuel injection for mixture formation and on the high compression of the air for self-ignition of the fuel.

The latter method has an inherently lower fuel consumption and thereby is much more economical.

The desirability of an engine that can burn both classes of fuel and, preferably a greater range of distillates has long been accepted. In addition, such an engine should have the low fuel consumption of the diesel engine.

A way of solving this problem was first discovered in the "M" system. In the "M" system where the fuel is applied to the surface of the combustion chamber to be evaporated and mixed with the air by means of the high-speed air swirl the fuel undergoes conditioning in such a manner as to confirm multi-fuel ability on this engine.

It was found, however, that in order to burn fuels of very low ignition quality further measures are necessary. It is necessary to reduce the ignition lag and this has been achieved primarily by increasing the compression ratio.

There is an alternative method of raising the final compression temperature viz. withholding residual gases in the cylinder after the combustion stroke.

It is not new to influence the amount of residual gas retained. To quote two typical examples:

(1) The static pressure of the gases displaced by the piston is raised by a damper or similar device to increase the pumping work in the exhaust stroke and, thereby, to make the engine an effective brake. This is the so-called exhaust brake.

(2) Measures and devices are adopted to correct the exhaust timing in accordance with a different operating speed so as to obtain an optimum timing in respect of optimum volumetric efficiency and, in the Otto engine, to obtain an optimum mixture ratio between the air and the fuel.

The object which the present invention is designed to meet calls for a completely new way of thinking which does not mean that there should be no known and proven elements of engineering used in realizing and implementing this object.

Figure 7:
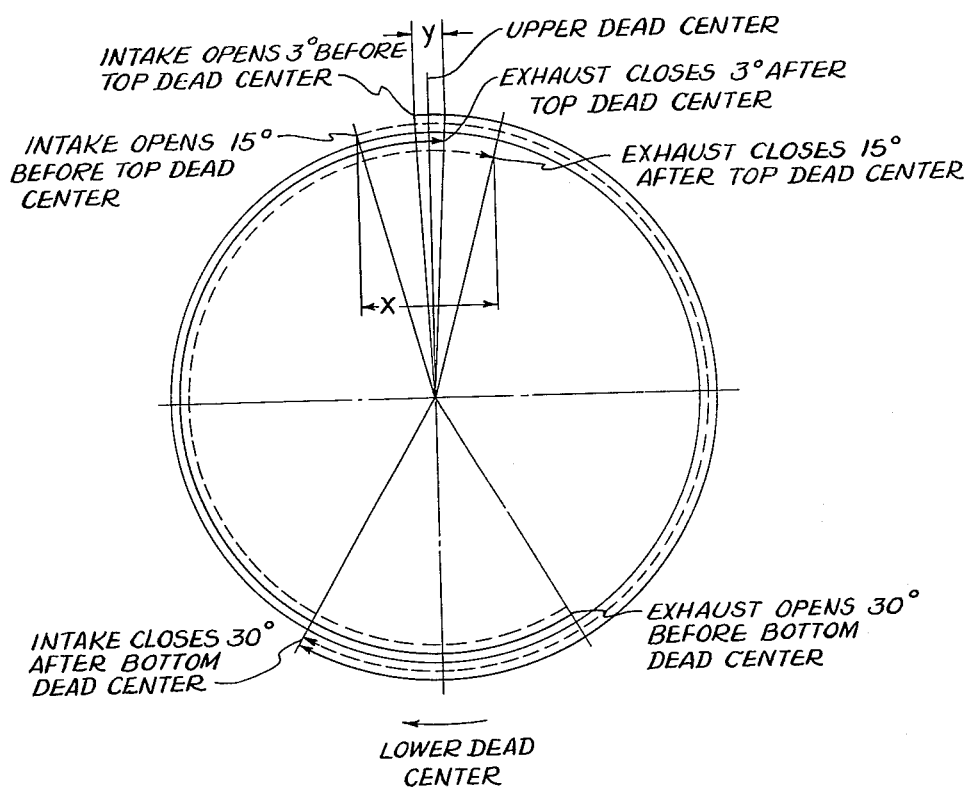

The means by which the object of the invention is obtained is described more fully with reference to the accompanying drawings in which:

FIGURE 1 is a front view, partially shown in cross-section, of an adjustable rocker arm leverage exhaust valve timing control;

FIGURES 2 to 6, inclusive, are similar views, each being a separate modified form of this invention;

FIGURE 7 is a graph showing the timing of the overlapping periods of the intake and exhaust valves according to a further form of this invention; and FIGURE 8 is a graph showing the results in starting time of this invention as compared to the prior art.

In accordance with this invention the percentage of residual gas in the cylinder is raised but not to an extent that would appreciably increase the pumping work in the exhaust stroke. It is increased only to such an extent that the final compression temperature is raised only just enough to reduce the ignition lag sufficiently in an engine intended for multi-fuel operation. Important factors in ensuring this are unburnt and partially burnt fuel fractions contained in the retained residual gas which also tend to promote ignition.

From this purpose and the associated conditions follow a definite set of rules. These are as follows:

(1) Fuel of low ignition quality calls for high residual gas retention.

(2) High engine temperatures call for lower residual gas retention.

(3) Low fuel feed calls for high residual gas retention.

Factors resulting in a high engine temperature may be a high ambient temperature, or a high cooling water temperature, or a high speed; a high engine temperature invariably calls for a relatively lower residual gas retention in the cylinder.

An important consideration is the co-functioning and overlapping of the various rules, for instance, a low ignition quality, and consequently the distillation characteristics of a fuel can be offset to a large degree by a high engine temperature. A most useful criterion of the engine temperature is the exhaust temperature which therefore lends tself readily as a controlled variable.

A series of tests was made to investigate three possibilities of improving the ignition conditions:

Preheating of the induction air, raising the compression ratio, and retention of working gases in the cylinder.

The results showed that whereas induction air preheating calls for a certain temperature in the engine itself it is possible, apart from raising the compression ratio, to improve ignition conditions even in a cold engine considerably by increasing the residual gas content of the cylinder charge. Increasing the residual gas content proved to be unproportionally more effective in running up an engine at ambient temperature (20 deg. C.) on 83/91 octane gasoline than raising the compression ratio from 16.5 to 19.

Initially the test engine was started and run with the production setting (compression ratio 16.5) on 83/91 octane gasoline. It was found that the cold engine could be run up at ambient temperature of 20 deg. C. at no-load within 15 minutes only from 500 r.p.m. to 750 r.p.m.

When the induction air temperature was raised from 20 deg. C. to 42 deg. C. by a hot air blower a slight improvement was recorded. Probably due to the extremely low cycle temperatures of the engine after starting at no-load, the improvement was scarcely measurable.

By increasing the compression ratio from 16.5 to 19 it was possible within 15 minutes to run the engine up from idling speed of 500 r.p.m. to 1430 r.p.m.

Increasing the residual gas content in the cylinder charge by shortening the exhaust opening time succeeded in raising the speed from the no-load speed of 500 r.p.m. to the governed speed of 2300 r.p.m. within less than 3 minutes.

This goes to show that the effectiveness of the third method (increasing the residual gas content) was distinctly greater than preheating the induction air by 20 deg. C. or raising the compression ratio from 16.5 to 19.

The exhaust opening period in the production engine was 240 deg. (exhaust valve opening 50 deg. before bottom dead centre and closing 10 deg. after top dead centre). The exhaust opening period for the maximum amount of residual gas retention was approximately 129 deg. (exhaust valve opening 8 deg. after bottom dead centre and closing 43.5 deg. before top dead centre).

These results are reflected convincingly in the attached graph of FIGURE 8.

For the purpose of the tests the exhaust valve opening period was shortened, and the valve lift decreased, by increasing the tappet clearance to 5 mm. Not only did this reduce the effective cam lift but the effective ramp angle of the cam was also reduced.

To obviate a sharp impact at the point where the cam produces effective valve action, a spring was interposed in the valve train during the test. As a production feature the invention proposes the use of a hydraulic tappet which, in contrast to conventional applications, will have a substantially greater effective adjusting range. In a further embodiment of the invention it is proposed to adopt a cam contour where the acceleration of the valve train in the adjusting range is maintained within tolerable limits.

As a further solution the invention proposes variation of the exhaust valve timing and valve lift by adjusting the rocker arm leverage.

A typical example is shown in FIGURE 1. Valve 1 is operated by the rocker arm 2 from the push rod 3.

Contrary to the usual arrangement the fulcrum of the rocker arm is provided by the abutment 4a of the bell-crank lever 4, 6 which is pivoted in the bracket 5 on the cylinder head.

The bell-crank lever 4, 6 can be moved in the direction of the arrow. It is arranged to be actuated by a heat sensing element arranged in the exhaust gas flow, high exhaust gas temperatures causing the abutment 4a to be moved towards the left to give a high lever ratio between the push rod and the valve. Low exhaust temperatures cause the abutment to move towards the right so that a low lever ratio is obtained. In order to locate the rocker arm axially there is on the spring seat 7 a bracket 8 which by means of the pin 9 which has ample play in the valve restrains the rocker arm 2 from appreciable endwise movement.

By means of a differential linkage of the type used in regulators or governors adjustment is proposed to be made by hand or automatically in accordance with the Rule No. 1 for the type of fuel used.

Figure 2:
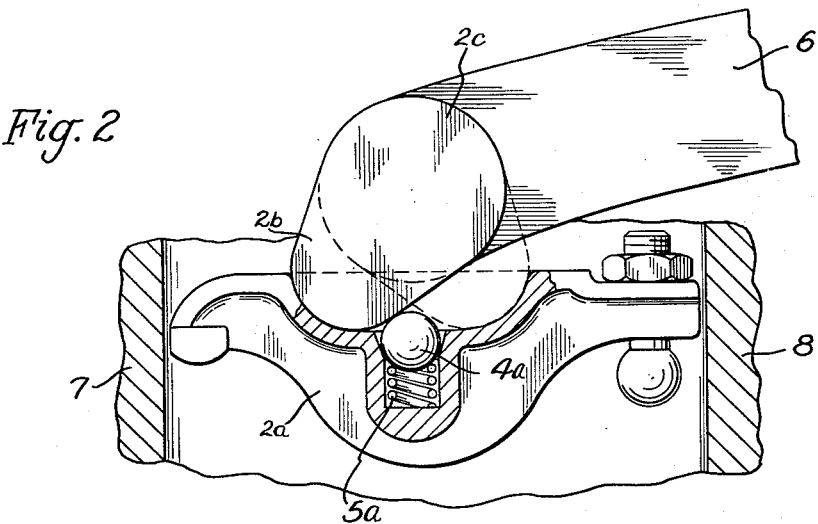

An alternative configuration is shown in FIGURE 2.

The rocker arm 1a is arranged to pivot on the circular-face cam 2b on the shaft 2c. The set cam 2b is held in either of two sockets in the rocker arm by means of a ball 4a which is spring-loaded by spring 5a. This arrangement provides alternative lever ratios of the rocker arm 2a resulting primarily in a substantial variation of the valve lift. The shaft 2c can be rotated according to the invention by means of lever 6 either by hand or automatically in accordance with exhaust gas temperature variations or in accordance with variations of both the exhaust gas temperature and fuel properties (for instance the specific gravity of fuel). Provision has to be made in this arrangement to prevent the rocker arm 2a to move endwise as the cam is moved from one socket to the other. In the example shown this is effected by the limiting surfaces 7 and 8.

Figure 3:
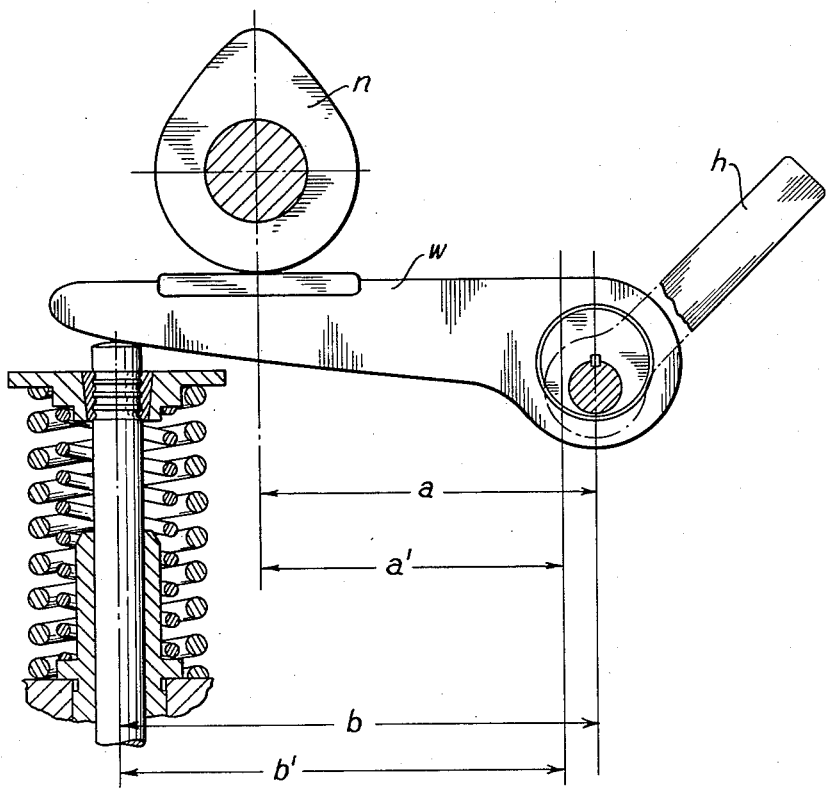

In addition to these three novel configurations the basic aim of this invention can also be realized by varying the valve lift by a configuration as shown in FIGURE 3.

The letter "n" designates the valve actuating cam, "w" is a follower lever and "h" the adjusting handle. While the cam lift remains unchanged the valve lift is varied by changing the fulcrum point of the eccentrically mounted lever "w". The handle "h" serves to adjust the eccentric and this can be done by hand or automatically, whereby the original distance "a" is changed into a' and the distance "b" into b'.

Figure 4:
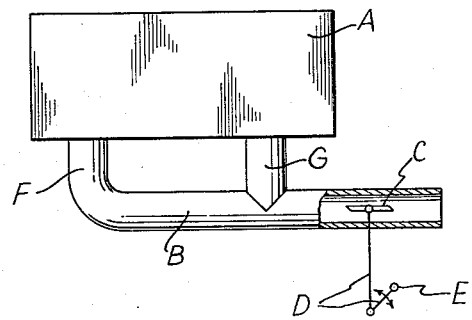
Figure 5:
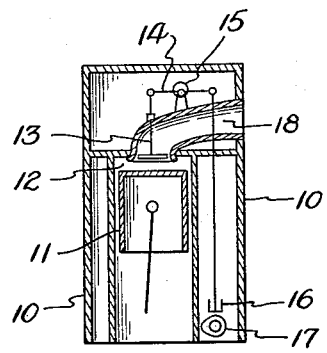
Figure 6:
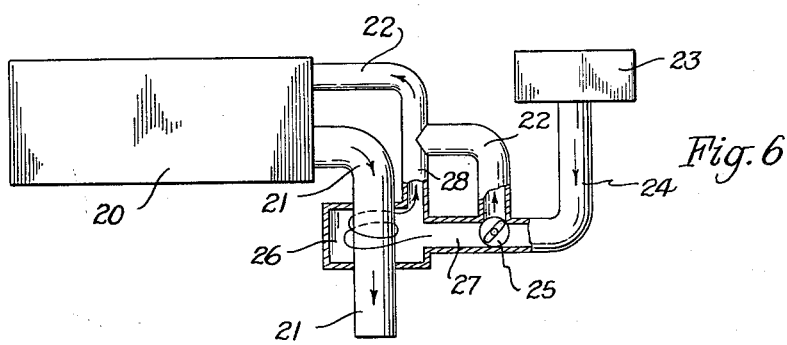

Very straight-forward embodiments of the principles of this invention are shown in FIGURES 4, 5 and 6. As shown in FIGURE 4, a damper, slide, stopcock, or even a valve may be positioned in the exhaust pipe and function as a regulating device for the residual gas content in the engine cylinder. Engine A is provided with an exhaust gas passage in the form of an exhaust manifold B within which a throttle valve C is mounted. Valve C is connected by arm D to the manually operable lever E by means of which valve C is opened or closed. When the valve C is partially or fully closed, the back-pressure on the exhaust gas coming from the engine or motor A through exhaust conduits F and G is raised, thus increasing the residual gas content in the engine cylinders. This method can also function as an exhaust brake.

In FIGURE 5, the residual gas content is regulated by varying the effective area of the exhaust valve opening or the exhaust valve timing. Engine 10 has a piston 11 movable in cylinder 12 and provided with an exhaust valve 13. Valve 13 is actuated by means of rocker arm 14 which is pivoted on an adjustable eccentric bearing 15. Tappet 16 joins arm 14 to cam 17. According to the timing of the opening and closing and for the lift of the exhaust valve 13, the residual gas content in cylinder 12 can be regulated in its escape from cylinder 12 though conduit 18 into the atmosphere. Alternatively, the lift of valve 13 can be varied by means of a cam arrangement which permits a change in the transformation ratio from the cam to the push rod or the valve while the engine is running; adjustable cam shafts such as those that can be shifted relative to the cam shaft and double cams; and an adjustable bushing located between the bearing body and a sleeve valve if such is used in place of a poppet valve.

As shown in FIGURE 6, the residual gas content is regulated by controlling the thermal condition of the air supplied the cylinder and accordingly the weight of the intake air. The engine 20 is provided with an exhaust pipe 21 and an air intake pipe 22. Fresh air coming from the air filter 23 flows through pipe 24 containing a stopcock 25 which acts as a control device. Consequently, the fresh air can be diverted from intake pipe 22 into a heat exchanger 26 through connecting pipe 27 and the thus heated intake air passed into intake pipe 22 from pipe 28. The heat exchanger extracts sensible heat from exhaust pipe 21.

As shown in FIGURE 7, the residual gas content in the cylinder can be regulated according to this invention by regulating the timing of the overlapping of the air intake and gas exhaust periods by the use of well-known elements. This can be done without interrupting the gas changeover process by the control of the intensity of the clearance-volume gas circulation. It is especially preferable for high speed engines and supercharged engines which operate with a relatively large overlapping of the opening and closing of the gas change elements.

In FIGURE 7, the overlap $x$ of the valve opening and closing times with reference to the crank shaft angle is shown. The broken lines represent the large scavenging time for the cylinder space. The distance $y$ represents the small overlap period. Raising the compression ratio in multi-fuel engines—conventional engines often have a compression ratio of 24:1—entails considerable disadvantages. This is because it involves not only an increase in the final compression temperature—which is desirable—but also an increase in the final compression pressure which is most undesirable because it entails higher stressing of the piston/connecting rod/crankshaft system and the bearings. The increase in the final compression pressure furthermore involves an increase in the peak combustion pressure which has an even more detrimental effect on the reciprocating parts and the bearing life, and also enhances the thermal stressing of the engine. Similarly, the engine noise increases due to the higher compression pressure and the higher peak combustion pressures. Moreover, the attainable output of an engine employing a high compression ratio is lower, if only because of the higher friction losses incurred. All these disadvantages are avoided in this invention. It is unique in permitting a relatively low compression ratio even in multi-fuel engines. This is conditional upon the following rules being observed in accordance with our application.

If the engine is cold it is necessary in order to raise the exhaust temperature and, consequently, to improve the ignition conditions, to retain a high percentage of exhaust gas in the cylinder. As the engine temperature rises, the amount of exhaust gas retained can be reduced because of the progressively increasing working gas temperatures. At a temperature corresponding to full load it is in most cases not necessary to retain any exhaust gas except when fuels are used which have an extremely low ignition quality (equivalent to an extremely high octane rating) such as gasolines containing a high percentage of lead tetraethyl (TEL) and aromatics or primary alcohols. The lower the ignition quality of a fuel the greater the amount of exhaust gases that has to be retained in the cylinder.

The applications of this method are not limited to multi-fuel operation, it can also be employed and this is another object of this invention to reduce the amount of obnoxious matter emitted from the engine. For such applications the following rule applies:

*Rule 4*

The more the amount of obnoxious matter emitted with the exhaust gases is required to be reduced the higher the percentage of residual gases to be retained in the cylinder.

Further means of controlling the amount of residual gas retained in the cylinder in addition to those listed further above are as follows:

(a) shifting the opening time of the intake valve into the exhaust phase, whereby the percentage of residual gas is increased,
(b) delayed closing of the exhaust valve to increase the percentage of residual gas,
(c) reduction of valve overlap,
(d) reduction of valve lift,
(e) utilizing pulsations of the gases in the induction or exhaust pipes, for instance by producing a negative pressure during the exhaust phase while the intake valve is still open and, simultaneously, building up a positive pressure at the exhaust valve. In this case, part of the exhaust gases discharged in the exhaust pipe are caused to flow back into the cylinder and, in addition, a small part of the burnt gases in the working cylinder emerges into the induction pipe in order to be drawn back into the engine cylinder during the suction stroke.
(f) increasing the back pressure in the exhaust system by providing a damper or valve in the exhaust pipe as nearly as possible to the cylinder outlet port which is adjusted by means of a lever in accordance with one of the afore-mentioned criteria.

As an alternative to using the exhaust gas temperature as a criterion for the variation of the amount of residual gas retained in the cylinder it is proposed in the present invention that other such criteria may be the accelerator pedal position and the chemical exhaust gas analysis. Similarly, the specific gravity of the fuel may be used as an automatically acting criterion because the specific gravity of the fuel is largely a function of the fuel properties and, consequently, the ignition quality and the distillation characteristics. In this case the invention also includes manual operation of the respective control elements.

While typical embodiments have been described for reciprocating engines the invention also covers application of this principal method to rotary engines where very straight-forward configurations are obtained because this type of engine has no valves, the gear admission and gas discharge being controlled by the rotor covering and uncovering ports in the casing.

Having now described the means by which the objects of the invention are obtained,

We claim:

1. A method of utilizing the waste gases obtained after combustion in the cylinder of an internal combustion engine comprising regulating the gas changeover system for the cylinder to retain in the cylinder during the next combustion stroke a variable percentage of the waste gases in accordance with typical operation criteria such as variables directly or indirectly related to the engine temperature, the proportion of waste gas so retained being increased for operation on fuel having a low ignition quality and lowered for operation under conditions of high engine temperature and increased for conditions of low fuel feed such as for low load and engine speed and raised for operation under conditions where minimum obnoxious constituents are required in the exhaust gases.

2. In an internal combustion engine using a method of operation in which the transformation ratio between the camshaft and the valve is varied in proportion with the exhaust gas temperature or the specific gravity of the fuel so that under conditions of low exhaust temperatures and low self-ignition quality fuels a small valve lift is produced and consequently a high percentage of waste gas is retained and under conditions of high exhaust temperatures and good ignition quality fuels a large valve lift is produced which results in a small percentage of waste gas being retained, said engine having variable fulcrum rocker arm means comprising a circular arc rocker arm, a movable abutment engageable with said arm, a bell crank lever joined to said abutment, and vertical guiding means for said arm.

References Cited by the Examiner

UNITED STATES PATENTS

| | | | |
|---|---|---|---|
| 1,175,820 | 3/16 | Rounds | 123—90 |
| 1,318,542 | 10/19 | Chevrolet | 123—90 |
| 1,660,609 | 2/28 | Fornaco | 123—122 |
| 1,751,244 | 3/30 | McNulty | 123—90 |
| 1,952,881 | 3/34 | Minter | 123—75 |
| 2,305,946 | 12/42 | Wilson | 123—52 |
| 2,412,457 | 12/46 | Harrison | 123—90 |
| 2,753,148 | 7/56 | Oetiker | 123—97 |
| 2,880,712 | 4/59 | Roan | 123—90 |
| 2,887,993 | 5/59 | Shallenberg | 123—90 |
| 3,116,725 | 1/64 | Hadley | 123—119 |

RICHARD B. WILKINSON, *Primary Examiner.*
KARL J. ALBRECHT, *Examiner.*